(12) United States Patent
Mercer

(10) Patent No.: US 11,865,523 B2
(45) Date of Patent: Jan. 9, 2024

(54) COBALT CATALYSTS AND PRECURSORS THEREFOR

(71) Applicant: JOHNSON MATTHEY PUBLIC LIMITED COMPANY, London (GB)

(72) Inventor: Richard John Mercer, Billingham (GB)

(73) Assignee: JohnsonMatthey Public Limited Company, London (GB)

( * ) Notice: Subject to any disclaimer, the term of this patent is extended or adjusted under 35 U.S.C. 154(b) by 116 days.

(21) Appl. No.: 17/310,183

(22) PCT Filed: Mar. 10, 2020

(86) PCT No.: PCT/GB2020/050568
§ 371 (c)(1),
(2) Date: Jul. 23, 2021

(87) PCT Pub. No.: WO2020/183148
PCT Pub. Date: Sep. 17, 2020

(65) Prior Publication Data
US 2022/0097029 A1 Mar. 31, 2022

(30) Foreign Application Priority Data

Mar. 14, 2019 (GB) ..................................... 1903502

(51) Int. Cl.
| | | |
|---|---|---|
| *B01J 23/89* | (2006.01) | |
| *B01J 6/00* | (2006.01) | |
| *B01J 21/06* | (2006.01) | |
| *B01J 23/889* | (2006.01) | |
| *B01J 35/00* | (2006.01) | |
| *B01J 35/08* | (2006.01) | |
| *B01J 35/10* | (2006.01) | |
| *B01J 37/02* | (2006.01) | |
| *B01J 37/16* | (2006.01) | |
| *C10G 2/00* | (2006.01) | |

(52) U.S. Cl.
CPC .......... *B01J 23/8913* (2013.01); *B01J 6/001* (2013.01); *B01J 21/063* (2013.01); *B01J 23/8892* (2013.01); *B01J 35/006* (2013.01); *B01J 35/0053* (2013.01); *B01J 35/08* (2013.01); *B01J 35/1014* (2013.01); *B01J 37/0201* (2013.01); *B01J 37/0215* (2013.01); *B01J 37/16* (2013.01); *C10G 2/332* (2013.01)

(58) Field of Classification Search
CPC ...... B01J 23/8913; B01J 6/001; B01J 21/063; B01J 23/8892; B01J 35/0053; B01J 35/006; B01J 35/08; B01J 35/1014; B01J 37/0201; B01J 37/0215; B01J 37/16; C10G 2/332
USPC .......... 502/326, 350, 330, 331; 518/713–715
See application file for complete search history.

(56) References Cited

U.S. PATENT DOCUMENTS

| | | | |
|---|---|---|---|
| 4,822,824 A | 4/1989 | Glesia et al. | |
| 6,124,367 A * | 9/2000 | Plecha ..................... | C10G 2/33 518/700 |
| 2009/0305881 A1* | 12/2009 | Sietsma ................. | C10G 2/333 502/259 |
| 2014/0045953 A1* | 2/2014 | Daly ........................ | C10G 2/34 502/241 |
| 2016/0016154 A1* | 1/2016 | Richard ............... | B01J 19/0093 518/715 |
| 2016/0074837 A1 | 3/2016 | Espinoza et al. | |

FOREIGN PATENT DOCUMENTS

| | | | | |
|---|---|---|---|---|
| WO | 97/00231 A1 | 1/1997 | | |
| WO | WO-2004028687 A1 * | 4/2004 | ............ | B01J 21/063 |
| WO | 2011/048361 A1 | 4/2011 | | |
| WO | 2012/146903 A1 | 11/2012 | | |
| WO | 2012/146950 A1 | 11/2012 | | |
| WO | WO-2012153218 A1 * | 11/2012 | ............. | B01J 23/75 |
| WO | 2016/050520 A1 | 4/2016 | | |
| WO | 2018/146277 A1 | 8/2018 | | |
| WO | 2018/162363 A1 | 9/2018 | | |

* cited by examiner

*Primary Examiner* — Patricia L. Hailey
(74) *Attorney, Agent, or Firm* — BakerHostetler

(57) ABSTRACT

A cobalt catalyst precursor is described comprising cobalt oxide crystallites disposed within pores of a titania support, wherein the cobalt oxide crystallites have an average size as determined by XRD in the range 6 to 18 nm, and the titania support is a spherical titania support with a particle size in the range 100 to 1000 μm, wherein the catalyst precursor has a pore volume of 0.2 to 0.6 cm³/g and an average pore diameter in the range 30 to 60 nm, and wherein the catalyst precursor has a ratio of the average cobalt oxide crystallite size to the average pore diameter in the range 0.1:1 to 0.6:1. The catalyst precursor may be reduced to provide catalysts suitable for use in Fisher-Tropsch reactions.

25 Claims, No Drawings

COBALT CATALYSTS AND PRECURSORS THEREFOR

This invention relates to cobalt catalyst precursors comprising cobalt oxide supported on titania particles, a method for manufacturing such precursors and the use of such precursors in preparing fixed bed Fischer-Tropsch catalysts.

Fischer-Tropsch catalysts having a nominal diameter less than about 1 mm offer the possibility of high reaction rates and improved selectivity to C5+ hydrocarbons and are usually associated with use in a suspended state, such as in a slurry bubble column reactor, because their use in a fixed bed at a commercial scale would normally be rendered impractical by an unacceptably high pressure drop.

WO2012/146903 A1 discloses a Fischer-Tropsch process using a fixed bed of small particle catalyst wherein the catalyst is disposed within a plurality of catalyst containers placed within externally-cooled reaction tubes. The catalyst particles may have a diameter of from about 100 μm to about 1 mm.

Whereas such processes offer an opportunity to produce an improved suite of hydrocarbon products, there is a need to improve the performance of small particle catalysts suitable for use in fixed bed Fischer-Tropsch processes.

Titania-supported catalysts offer enhanced performance in the Fischer-Tropsch process. For example, WO97/00231 discloses a catalyst for use in a process for the preparation of hydrocarbons comprising cobalt and manganese and/or vanadium, supported on a carrier, wherein the cobalt: (manganese and/or vanadium) atomic ratio is at least 12:1. In the examples, commercially available rutile titania particles of 30-80 MESH particle size were impregnated with a cobalt nitrate solution, with or without manganese nitrate, dried at 120° C. and calcined at 400° C. U.S. Pat. No. 4,822,824 discloses a catalyst useful for preparing higher hydrocarbons from synthesis gas prepared by depositing cobalt and ruthenium on a refractory carrier such as a titania and oxidizing and reducing the catalytic metals to form a catalyst in which the cobalt and ruthenium are in intimate contact. These catalysts were, however, tested in laboratory-scale testing equipment for relatively short periods of time. There therefore remains a need for small particle catalysts suitable for use in commercial-scale fixed bed Fischer-Tropsch processes that demonstrate high activity and selectivity and that exhibit stable operation during extended use.

Accordingly the invention provides a cobalt catalyst precursor comprising cobalt oxide crystallites disposed within pores of a titania support, wherein the cobalt oxide crystallites have an average size as determined by XRD in the range 6 to 18 nm, and the titania support is a spherical titania support with a particle size in the range 100 to 1000 μm, wherein the catalyst precursor has a pore volume of 0.2 to 0.6 $cm^3/g$ and an average pore diameter in the range 30 to 60 nm, and wherein the catalyst precursor has a ratio of the average cobalt oxide crystallite size to the average pore diameter in the range 0.1:1 to 0.6:1.

The invention further provides a method for preparing the catalyst precursor by impregnating a spherical titania support with cobalt nitrate and drying and calcining the impregnated titania support to form cobalt oxide crystallites within the pores of the titania support.

The invention further provides a catalyst formed by the reduction of the cobalt oxide crystallites in the catalyst precursor by a reducing gas stream to form elemental cobalt crystallites. The reducing gas may be applied ex-situ, before installation of the catalyst precursor in a Fischer-Tropsch process, in which case the catalyst may subsequently be encapsulated in wax, or subjected to a passivation treatment, prior to installation in a Fischer-Tropsch process. Alternatively, the reducing gas may be applied in-situ after installation of the catalyst precursor in a Fischer-Tropsch reactor.

The invention further provides a combination of the catalyst precursor, or the catalyst, disposed within a catalyst carrier suitable for use in a reaction tube of a Fischer-Tropsch reactor.

The invention further provides a process using the catalyst precursor or the catalyst in a Fischer-Tropsch reactor to produce hydrocarbons from a synthesis gas comprising hydrogen and carbon monoxide.

The catalyst precursor comprises cobalt oxide crystallites. The cobalt oxide crystallites preferably consist essentially of $Co_3O_4$ with no detectable CoO or other cobalt oxides or hydroxides. The average particle size of the cobalt oxide crystallites is in the range 6-18 nanometres (nm), preferably 7-16 nm, more preferably 8-12 nm. The average particle size is determined by X-Ray Diffraction (XRD). A particularly suitable method uses Bruker D8 Advance XRD equipment with a Cu Kα Wavelength 1.5406 Angstroms with Lynxeye PSD detection. This detection system is useful because the operational setting can be adjusted to suppress the fluorescence generated by the presence of cobalt. Rietveld refinement and Scherrer line broadening are common methods of XRD crystallite size determination. Though either method may be used, Rietveld refinement is preferred.

The catalyst precursor comprises a spherical titania support. The term "spherical support" includes support shapes with a sphericity (ψ), of at least about 0.90, preferably at least about 0.95, and roughly spherical agglomerates of titania powders. The spherical titania particles may be termed "microspheres". The particle size of the titania support is in the range 100 to 1000 micrometres (μm), preferably 300-800 μm. The volume-median diameter, D[v, 0.5], of the titania support within this range is preferably in the range 300-500 μm, more preferably 350-450 μm, most preferably 350-425 μm, especially 375-425 μm. The catalyst precursor possesses essentially the same particle size characteristics as the catalyst support. The catalyst precursor therefore provides a high activity catalyst with an acceptable pressure drop when used in a commercial-scale fixed bed, especially when used as a fixed bed within a catalyst carrier in a multi-tubular Fischer-Tropsch reaction vessel. The term volume-median diameter D[v,0.5], sometimes given as D50 or D0.5, is defined by Dr Alan Rawle in the paper "Basic Principles of Particle Size Analysis" available from Malvern Instruments Ltd, Malvern, UK (www.malvern.co.uk), and is calculated from the particle size analysis which may conveniently be effected by laser diffraction for example using a Malvern Mastersizer®.

Suitable spherical titania supports are commercially available. The spherical titania support may, if required, be conveniently pre-formed from commercially available titania powders made by flame-hydrolysis or flame pyrolysis of titania precursors such as titanium tetrachloride. Commercially available titania powders typically have a particle size of less than 5 micrometres and so the spherical titania support typically comprises agglomerates of the titania powders. One or more binders, for example a polymer binder, may be present in the support to increase its strength, although this is not essential. The agglomerates may be formed by any suitable shaping technique that produces spheres such as spray-drying, granulation, spray-granulation, drip casting or spheronization.

The titania support is preferably low in elements that have been found to be poisons for the cobalt catalysed Fischer- Tropsch reaction, such as sulphur and the alkali metals. Accordingly, the sulphur content of the catalyst precursor is desirably <30 ppmw, and the alkali metal (e.g. Na or K) content of the catalyst precursor is preferably <50 ppmw. Furthermore, to avoid corrosion of catalyst manufacturing and handling equipment, the chloride content of the catalyst precursor is preferably less than 1500 ppmw, especially less than 650 ppmw. The titania may be washed to reduce the presence of these contaminants before or after shaping to achieve the desired levels.

Titania may exist in a rutile or anatase crystal form. The catalyst precursor preferably comprises an anatase-containing support, preferably an anatase-rich support in which the anatase form is present in an amount >50% by weight of the support. More preferably the titania support has an anatase content ≥70% by weight of the support, and most preferably the titania support has an anatase content ≥80% by weight of the support. The anatase form of titania is more porous and softer than the rutile form, making it particularly suitable for use as a Fischer-Tropsch catalyst precursor support.

Desirably, the titania support has a BET surface area in the range 25-75 $m^2/g$.

The pore volume of the catalyst precursor is in the range 0.20 to 0.60 $cm^3/g$, preferably 0.30 to 0.50 $cm^3/g$. The average pore diameter of the catalyst precursor is preferably in the range 30-60 nm, more preferably 40-50 nm. The BET surface area of the catalyst precursor is preferably in the range 35-65 $m^2/g$. BET surface area and pore volume may be measured using nitrogen physisorption. Pore volume may also be determined using mercury porosimetry. In the present invention, as the pore diameters are relatively large, mercury porosimetry, also known as mercury intrusion porosimetry, may be more suitably used. Pore diameters may also be determined using these techniques. Mercury intrusion porosimetry is a well-known technique that involves exposing a powdered sample to mercury under pressure and measuring changes in volume. By "average pore diameter", we mean four times the pore volume divided by the surface area (4V/A). This relationship is derived from the geometry of a right circular cylinder with diameter D and height h, for which the surface area (A) is given by $\pi Dh$ and the volume (V) is given by $\pi D^2 h/4$.

The catalyst precursor has small cobalt oxide crystallites located within the pores of the catalyst support. The catalyst precursor has a ratio of the average cobalt oxide crystallite size to the average pore diameter of the catalyst precursor in the range 0.1:1 to 0.6:1, preferably 0.2:1 to 0.4:1. This ratio is surprising because it is generally considered that the pore diameter of the support controls the metal oxide crystallite size and that pores with a large average diameter will result in large cobalt oxide crystallites. The Applicant has surprisingly found that small cobalt oxide crystallites form in the relatively large pores of the titania support. The Applicant has found the combination of the titania support physical properties, the cobalt source and preparation conditions produce a catalyst precursor having the claimed ratio, which provides for a Fischer-Tropsch catalyst with enhanced performance.

The preparation method that generates a catalyst precursor having the claimed ratio contrasts with prior art impregnation/deposition methods, such as those employing cobalt ammine carbonate solution, since such methods typically produce very small cobalt oxide crystallites of typically <5 nm average size which can be difficult to reduce and once reduced tend to sinter rapidly under FT conditions, leading to loss of activity.

Without wishing to be bound by theory, the improved catalyst performance resulting from a catalyst precursor with the claimed ratio of average pore diameter to average cobalt crystallite size may arise because the claimed ratio facilitates diffusion of reactants and products to and from catalytically active sites located within the pore structure thereby enhancing catalyst selectivity as well as providing high activity. Furthermore, using the titania support having relatively large pores and populating these pores with relatively small cobalt oxide crystallites offers an advantage in providing longer hydrocarbon chain products and potentially a higher alpha value than previously possible.

The cobalt content of the oxidic catalyst precursor is preferably in the range 5 to 25% by weight, more preferably 8 to 16% by weight, expressed as Co. Despite a relatively low cobalt content, the resulting catalysts have a surprisingly high activity per gram in the Fischer Tropsch reaction. In the active catalyst, at least a portion of the cobalt oxide in the catalyst precursor is reduced to elemental form, which increases the proportion of cobalt in the active catalyst as the oxygen atoms in the cobalt oxide are removed. Particularly effective catalysts comprise 8 to 12% by weight cobalt at a degree of reduction of the cobalt oxide of 80 mol %.

The catalyst precursor may further comprise one or more additives and/or promoters to enhance catalytic performance in the Fischer-Tropsch process. Additives are typically incorporated into the catalyst precursor at higher concentration than promoters. Suitable additives are selected from compounds of barium (Ba), silver (Ag), copper (Cu), nickel (Ni), iron (Fe), vanadium (V), tin (Sn), gallium (Ga), manganese (Mn), zirconium (Zr), lanthanum (La), cerium (Ce), magnesium (Mg), zinc (Zn), aluminium (Al), thorium (Th), tungsten (W) or silicon (Si). Suitable promoters include rhodium (Rh), iridium (Ir), ruthenium (Ru), rhenium (Re), platinum (Pt) and palladium (Pd). It has been found that titania-supported cobalt Fischer-Tropsch catalysts preferably further comprise manganese, which is present in the catalyst precursor as one or more manganese oxides. If desired, one or more promoters selected from Ru, Re, and Pt may be included in the catalyst precursor. Additives and/or promoters may be incorporated into the catalyst precursor by use of suitable compounds such as acids, e.g. perrhenic acid, metal salts, e.g. metal nitrates and oxy-nitrates or metal acetates, or suitable metal-organic compounds, such as metal alkoxides or metal acetylacetonates. The amount of additive metal may be varied between 1 and 25% by weight in the catalyst precursor, preferably between 1 and 15% by weight in the catalyst precursor. The amount of promoter metal may be varied between 0.01 and 1.00% by weight in the catalyst precursor, preferably between 0.01 and 0.50% by weight in the catalyst precursor.

The catalyst precursor is prepared by impregnating the spherical titania support with a cobalt nitrate solution and drying and calcining the impregnated titania support to form cobalt oxide crystallites within the pores of the titania support. The impregnation, drying and/or calcination may be repeated if necessary to achieve the desired catalyst precursor.

The cobalt nitrate is preferably cobalt (II) nitrate hexahydrate that may be dissolved in its water of hydration, for example by heating to above 50° C., to form a concentrated solution of molten cobalt nitrate. Alternatively, the cobalt nitrate may be dissolved in water or another solvent to form a more dilute solution. Water, desirably demineralised water, is the preferred solvent. The impregnation may be performed by adding a cobalt nitrate solution to the spherical titania support in a suitable mixer, such as a ploughshare mixer. The impregnation is preferably performed with a heated cobalt nitrate solution at a temperature above 50° C. The volume of the cobalt nitrate solution used preferably approximates to the total pore volume of the titania support. Such an impregnation, which may be termed a "dry impregnation" or "incipient wetness impregnation" advantageously improves the deposition of cobalt compounds within the pores of the support and minimises the amount of drying required. If desired, suitable compounds of additives and/or promoters may be added in suitable amounts to the cobalt nitrate solution. Alternatively, they may be combined with the catalyst precursor before or after drying and/or before a final calcination.

The impregnated support is dried to remove the solvent, typically water, present in the cobalt nitrate solution and desirably leave a partially hydrated cobalt nitrate in the pores of the support. The drying step is preferably performed at a temperature in the range 50-150° C. The drying step may be performed at atmospheric pressure in air or an inert gas such as nitrogen, or under a vacuum. The drying time may be in the range 0.5 to 16 hours as required, although more preferably it is performed at 80-120° C. for 1-5 hours.

The dried impregnated support is a free-flowing powder containing cobalt nitrate, preferably a partially hydrated cobalt nitrate. To produce the catalyst precursor, the dried material is subjected to a heat treatment, which may be termed a calcination, to convert the cobalt nitrate into crystalline cobalt oxide with the desired crystallite size range. The heat treatment may be performed conventionally in air or by heating the dried material under nitrogen or another non-reducing gas mixture or by heating under vacuum. The heat treatment may be performed in static or moving bed ovens or, preferably, in a fluidized bed reactor. A fluidized bed reactor surprisingly has been found to produce catalyst precursors with small average cobalt oxide crystallite sizes, e.g. in the range 6-12 nm, especially 7-8 nm. The calcination temperature in the present invention is desirably in the temperature range 220-320° C., preferably 240-300° C., to minimise sintering of the cobalt oxide crystallites and maintain the cobalt surface area. Calcination at these temperatures also avoids the possibility of converting anatase in the titania support to the rutile form. The calcination time may be in the range 0.5-16 hours as required, although preferably it is performed at 240-300° C. for 1-4 hours. Under fluid bed conditions, the calcination gas hourly space velocity (GHSV) may be 1000-5000 $hr^{-1}$, preferably 2000-4000 $hr^{-1}$ at normal temperature and pressure (NTP).

The calcination step may be followed by a polishing step in which the calcined material is subjected to heating in a dilute hydrogen stream under conditions that do not cause reduction of the cobalt oxide to elemental form. The polishing step may advantageously be used to lower the residual nitrate content of the calcined material. The hydrogen stream may, for example consist of 0.1 to 10% by volume hydrogen, preferably 1-5% by volume hydrogen in an inert gas, such as nitrogen. The pressure may be 1-10 bar absolute, preferably 1-3 bar absolute. The maximum temperature for the polishing step may be in the range 100-225° C., preferably 140-200° C. The polishing step may suitably be performed for 0.5-16 hours as required, although preferably it is performed at 140-200° C. for 1-3 hours. The gas hourly space velocity (GHSV) of the hydrogen/inert gas stream in the polishing step may be 50-2000 $hr^{-1}$, but is preferably 50-1000 $hr^{-1}$, more preferably 100-500 $hr^{-1}$ at normal temperature and pressure (NTP). Under these conditions essentially no reduction of the cobalt oxide takes place. The polishing step reduces residual nitrate in the catalyst precursor down to levels below 0.1% by weight so that the subsequent reduction may be performed without having to take special steps to manage the ammonia that forms during reduction. This is especially useful when the catalyst precursor is reduced in-situ, i.e. in the reactor in which it is to be used for the Fischer-Tropsch process.

The catalyst precursor may be installed in the reactor in which it is to be used for the Fischer-Tropsch reaction and activated to form the catalyst by reduction of at least part of the cobalt oxide to elemental form in-situ. Such activation may be performed using any suitable reducing agent but is preferably performed using a reducing gas stream selected from a hydrogen gas stream or a synthesis gas stream comprising hydrogen and carbon monoxide. The reducing gas stream may consist of 1-100% by volume of hydrogen in an inert gas such as nitrogen or may be a synthesis gas. The synthesis gas may suitably be a Fischer-Tropsch synthesis gas consisting essentially of hydrogen and carbon monoxide in which the hydrogen:carbon monoxide molar ratio is in the range 1.6 to 2.2. The reducing gas may alternatively comprise a mixture of these gases. The gas hourly space velocity (GHSV) of the reducing gas through the catalyst precursor may be 4000 to 10000 $hr^{-1}$ at normal temperature and pressure (NTP). The gas hourly space velocity of the reducing gas may be altered during the reduction to control the exposure of the cobalt oxide and reduced cobalt to water vapour. The maximum temperature used for the reduction stage may be in the range 250-400° C. but is preferably in the range 250-300° C. to minimise sintering of the reduced cobalt crystallites. The reduction may be performed at ambient pressure or increased pressure, i.e. the pressure of the reducing gas may be from 1-50 bar abs.

Alternatively, the catalyst precursor may be pre-reduced ex-situ in a reduction vessel to provide the catalyst. The pre-reduction may be performed using any suitable reducing agent but is preferably performed using a hydrogen gas stream operating in a loop with removal of by-product water from the recycled reduction gas stream. The hydrogen stream may consist of 10-100% by volume of hydrogen in an inert gas such as nitrogen. The concentration of hydrogen in the reducing gas may be varied during the reduction. The gas hourly space velocity (GHSV) of the hydrogen/inert gas stream may be 3000 to 10000 $hr^{-1}$, preferably 4000 to 10000 $hr^{-1}$, at normal temperature and pressure (NTP). The gas hourly space velocity of the reducing gas may be altered during the reduction to control the exposure of the cobalt oxide and reduced cobalt to water vapour. The maximum temperature used for the reduction stage may be in the range 250-400° C. but is preferably in the range 250-300° C. to minimise sintering of the reduced cobalt crystallites. The reduction may be performed at ambient pressure or increased pressure, i.e. the pressure of the reducing gas may be from 1-50, preferably 1-20, more preferably 1-10 bar abs.

Catalysts in the reduced state can be difficult to handle as they can react spontaneously with oxygen in air, which can lead to undesirable self-heating and loss of activity. Consequently, the reduced catalyst may be protected by encapsulation of the reduced catalyst with a suitable barrier coating. In the case of a Fischer-Tropsch catalyst, this may suitably be a hydrocarbon wax, such as a wax produced by the Fischer-Tropsch synthesis. Alternatively, the reduced catalyst may be passivated following reduction by exposing it to an oxygen-containing gas, such as air or oxygen, which may be diluted with an inert gas such as nitrogen, to form a protective outer layer of cobalt oxide on the cobalt crystallites. The encapsulating wax or passivation outer layer of cobalt oxide may be removed from the catalyst once installed within the Fischer-Tropsch reactor by heating the catalyst under a hydrogen gas stream or a synthesis gas stream.

Whichever route is chosen; the cobalt catalysts provide high metal surface areas per gram of reduced metal. For example, the catalyst precursors, when reduced by hydrogen at 250° C., preferably have a cobalt surface area of 5 $m^2$/g catalyst as measured by hydrogen chemisorption.

The catalyst obtained from the catalyst precursor is particularly effective for the Fischer-Tropsch synthesis of hydrocarbons. The Fischer-Tropsch synthesis of hydrocarbons using cobalt catalysts is well established. The Fischer-Tropsch synthesis converts a mixture of carbon monoxide and hydrogen to hydrocarbons, preferably hydrocarbons with a carbon chain length ≥5. The mixture of carbon monoxide and hydrogen is typically a synthesis gas having a hydrogen: carbon monoxide ratio in the range 1.6 to 2.2:1. The reaction may be performed in a continuous or batch process using one or more reactors such as fixed-bed reactors, slurry-phase reactors, bubble-column reactors, loop reactors or fluidised bed reactors. The process may be operated at pressures in the range 0.1 to 10 Mpa and temperatures in the range 150 to 350° C. The gas-hourly-space velocity (GHSV) for continuous operation is in the range 1000 to 25000 $hr^{-1}$.

The catalysts of the present invention are particularly suitable as fixed bed catalysts, i.e. a bed of catalyst fixed within a reaction vessel through which the reactant synthesis gas is passed.

The catalyst precursor physical properties mean it is suitable for use in a microchannel reactor, i.e. a Fischer-Tropsch reactor having a plurality of catalyst-containing channels having a width or height in the range 2-10 mm through which a synthesis gas is passed, or, in a catalyst carrier placed in a reaction tube within a Fischer-Tropsch reaction vessel, such as a downflow multi-tubular Fischer-Tropsch reaction vessel.

The catalyst or catalyst precursor has been found to be of particular effectiveness when used in combination with a catalyst carrier suitable for use in a tubular reactor. By "catalyst carrier" we mean a catalyst container, for example in the form of a cup or can, configured to allow a gas and/or liquid to flow into and out of the carrier and through a bed of the catalyst or catalyst precursor disposed within the carrier. Any suitable catalyst carrier may be used. In one arrangement, the catalyst carrier is that described in WO2011/048361, the contents of which are incorporated herein by reference. The catalyst carrier described in WO2011/048361 comprises: an annular container for holding catalyst in use, said container having a perforated inner wall defining a tube, a perforated outer wall, a top surface closing the annular container and a bottom surface dosing the annular container; a surface closing the bottom of said tube formed by the inner wall of the annular container; a skirt extending upwardly from the perforated outer wall of the annular container from a position at or near the bottom surface of said container to a position below the location of a seal; and a seal located at or near the top surface and extending from the container by a distance which extends beyond an outer surface of the skirt. In one alternative arrangement, the catalyst carrier may be that disclosed in WO2016/050520, the contents of which are incorporated herein by reference. Thus, the catalyst carrier may comprise: a container suitable for holding the catalyst precursor or catalyst in place, said container having a bottom surface closing the container, and a top surface; a carrier outer wall extending from the bottom surface of said container to the top surface; a seal extending from the container by a distance which extends beyond the carrier outer wall; said carrier outer wall having apertures located below the seal. In a preferred arrangement, the catalyst carrier may comprise: an annular container suitable for holding the catalyst precursor or catalyst in place, said container having a perforated inner container wall defining an inner channel, a perforated outer container wall, a top surface closing the annular container and a bottom surface closing the annular container; and a surface closing the bottom of said inner channel formed by the inner container wall of the annular container. The catalyst carrier will generally be sized such that it is of a smaller dimension than the internal dimension of the reactor tube into which it is to be placed in use. The seal will be sized such that it interacts with the inner wall of the reactor tube when the catalyst carrier of the present invention is in position within the reactor tube.

In use in a vertical reactor with downflow, reactants flow downwardly through the reactor tube and thus first contact the upper surface of the catalyst carrier. Since the seal blocks the passage of the reactants around the side of the carrier, the top surface thereof directs them into the inner channel defined by the inner container wall. The reactants then enter the annular container through the perforated inner container wall and then pass radially through the catalyst bed towards the perforated outer container wall. During the passage from the inner container wall to the outer container wall, the reactants contact the catalyst and the Fischer-Tropsch reaction occurs. Unreacted reactants and product then flow out of the container through the perforated outer container wall. The carrier outer wall then directs reactant and product upwardly between the inner surface of the carrier outer wall and the perforated outer container wall of the annular container until they reach the apertures in the carrier outer wall. They are then directed through the apertures located in the carrier outer wall and flow downwardly between the outer surface of the carrier outer wall and the inner surface of the reactor tube where heat transfer takes place. In the event that the reactor is operated such that the flow is reversed, the path will be reversed.

The catalyst precursor may be loaded into the catalyst carrier and the resulting combination loaded into the reaction tubes of a Fischer-Tropsch reaction vessel for reduction and activation of the catalyst in-situ as described above. Alternatively, the combination may be subjected to a reduction ex-situ in a reduction vessel and the combination encapsulated or subjected to a passivation treatment. The resulting combination may then be safely loaded into the reaction tubes of a Fischer-Tropsch reaction vessel.

The invention will now be further described by reference to the following Examples.

In the Examples the following measurements were performed.

Particle Size: Particle sizes were determined according to ASTM D4464 by laser light scattering using a Malvern Mastersizer 3000 laser diffraction particle size analyser, using the optical properties of $TiO_2$ (Anatase) from the Malvern MS3000 optical property database in the instrument software. (Refractive Index 2.51, Absorption Index 0.01). Wet dispersion measurements were carried out in de-ionised water using 0% and 85% ultrasonication and a stirrer speed of 50% with a Hydro MV sample dispersion unit. Sufficient sample was added to the unit until the laser beam is obscured by between 0.1 and 20%. Five measurements were made for each aliquot of sample, with a measurement duration of 5 seconds. Dry dispersion measurements were made using 0.5 Bar and 3.0 Bar of dispersive air pressure using site compressed air, at a feed rate of 20% in an Aero dry dispersion unit with a micro-volume tray and a standard venturi. One measurement was made per aliquot of sample, with the whole aliquot being measured in each measurement. The measurement duration is 15 seconds when the laser beam is obscured by between 0.1 and 10%. To calculate the results, the Malvern software converts the resulting diffraction pattern into a particle size distribution using Mie Theory.

Pore Volume. Mercury intrusion/extrusion data was measured on a Micromeritics AutoPore 9520 mercury porosimeter in accordance with ASTM Method D4284-03; Test Method for Determining Pore Volume Distributions of Catalysts by Mercury Intrusion Porosimetry. Intrusion curves were measured over the pressure range of 0.5 to 60000 psia followed by extrusion down to atmospheric pressure. An equilibration time of 15 seconds was used for each data point on both the intrusion and extrusion curves, the mercury contact angle was taken to be 140° and the mercury surface tension taken as 485 dynes/cm. Samples were dried at 115° C. overnight in an oven prior to analysis. Temperature and pressure effects that are manifested during the porosimetry measurement were accounted for by blank correction runs on empty penetrometer tubes which were subsequently subtracted from the experimental data.

Surface areas were measured using a Micromeritics 2420 ASAP physisorption analyser by application of the BET method in accordance with ASTM Method D 3663-03; Standard Test for Surface Area. Nitrogen was used as the adsorbate and the measurements carried out at liquid nitrogen temperature (77K). The cross-sectional area of a nitrogen molecule was taken as 16.2 Å. Samples were outgassed prior to analysis by purging with dry nitrogen gas for a minimum of 1 hour at 140° C. Five relative pressure/volume data pairs were obtained over the relative pressure region of 0.05 to 0.20 P/Po inclusive. The equilibration time for each point was 10 second. Surface areas are reported based on the weight of the sample post outgassing.

Average Pore Diameter. The average pore diameter was calculated from the pore volume and surface area measurements. The average pore diameter is four times the corrected pore volume divided by the calculated surface area (4V/A). This relationship is derived from the geometry of a right circular cylinder with diameter D and height h, for which the surface area (A) is given by $\pi Dh$ and the volume (V) is given by $\pi D^2 h/4$.

Median Pore Diameter. The median pore diameter was derived from the pore volume measurement. By "median pore diameter" we mean the pore diameter representing the mid-point of the cumulative mercury intrusion curve, corrected for interparticle void filling.

Cobalt Content. Determined by ICPAES (inductively coupled plasma atomic emission spectroscopy) or ICPMS (inductively coupled plasma Mass Spectrometry) on the calcined catalyst precursors expressed as percentage cobalt by weight on a loss free basis.

Cobalt Oxide Crystallite Size. The cobalt oxide crystallite size was determined by XRD using a Bruker D8 Advance X-Ray Diffractometer. The powdered catalyst precursor sample was pressed into a sample holder and loaded into the instrument. Parallel beam (Gobel mirror) optic. Software; Bruker EVA for phase identification; Topas for pattern refinement. The diffractometer Conditions were as follows:

X-ray Cu Kα Wavelength 1.5406 Å with Lynxeye PSD detection.

| | |
|---|---|
| Starting 2 theta | 10, |
| Finish 2 theta | 130 |
| Step | 0.022 |
| Step time, sec | 4 |
| X-ray current, mA | 40 |
| X-ray voltage, kV | 40 |

Rietveld analysis (Bruker Topas v4.2) was used to determine cobalt oxide crystallite size. Rietveld refinement of powder XRD data starts with a calculated diffraction pattern based on symmetry information and an approximate structure. Rietveld refinement then uses a least squares minimisation to compare every observed point to the calculated plot and refines the calculated structure to minimise the difference.

Cobalt Surface Area. Cobalt metal surface areas were measured on a Micromeritics 2480 HTP 6 Station Chemisorption Analyser. The samples were reduced with 100% vol hydrogen at 250° C. for 120 minutes at a hydrogen flow rate of 200 SCCM. After the reduction stage was complete, the samples were purged with helium for 15 minutes before being cooled under vacuum to the analysis temperature of 35° C. Evacuation was continued for 45 minutes after achieving a vacuum of <10 µm Hg. The sample was then dosed with 100% vol. hydrogen over a range of pressures between 100 and 760 mmHg. At each pressure, the chemisorbed hydrogen was allowed to equilibrate, and the volume of hydrogen uptake was measure and recorded automatically. Pressure/uptake pairs were plotted to give an isotherm which exhibited a well-defined plateau region. Data points were selected within this region to achieve a best-line fit which was then extrapolated back to zero pressure. The intercept value was used to calculate the cobalt surface area using a stoichiometry of 1.0 for $H_2$/Co and the cobalt surface area reported based on the mass of reduced catalyst.

EXAMPLE 1

Catalyst Precursor Preparation on 312 µm Titania Spheres a) 20% w/w Co, 0.2% w/w Ru.

(i) 346.4 g of cobalt nitrate hexahydrate crystals (19.80% w/w Co) and 5.4 g of ruthenium nitrosyl nitrate solution (12.54% w/w Ru) were placed in a glass beaker and heated on a hotplate to 80° C. The hot solution was added to 500.05 g of 312 µm D50 titania spheres (>85% w/w anatase by XRD) in a preheated Z-blade mixer. The temperature of the titania was 65° C. and the mixer walls were 69° C. before addition of solution. The solution was poured into the mixing titania spheres over approximately 4 minutes. After solution addition, mixing was continued for 2 minutes. 842.0 g of impregnated material was discharged and placed in 7 stainless steel trays. This material was then dried for 3 hours at 110° C. and calcined at 280° C. for 2 hours. 599.9 g of calcined material was produced.

(ii) 594.3 g of the calcined material from step (i) was placed in the preheated Z-blade mixer. 286.7 g of cobalt nitrate hexahydrate crystals and 4.6 g of ruthenium nitrosyl nitrate were placed in a glass beaker and heated on a hotplate up to 80° C. The temperature of the material was 64° C. and the mixer walls were 68° C. before addition of solution. The solution was poured into the mixing material over approximately three minutes. After solution addition mixing was continued for 2 minutes. 876.2 g of impregnated material was discharged and placed in 7 stainless steel trays. This material was then dried for 3 hours at 110° C. and calcined at 280° C. for 2 hours. 671.8 g of calcined material was produced.

FT Catalyst Precursor Characterization
D50=311 µm
BET SA=39 m$^2$/g
Co SA=8 m$^2$/g
Hg intrusion volume=0.23 cm$^3$/g
Hg average pore diameter=36 nm
Hg median pore diameter=42 nm
Co$_3$O$_4$ crystallite size (XRD)=13.5 nm
Co content (ICP)=18.4% w/w
Ru content (ICP)=0.15% w/w
Ratio of the average cobalt oxide particle size to the average pore diameter of the catalyst precursor=13.5:36=0.38:1 b) 11% w/w Co, 1% w/w Mn.

320.6 g of cobalt nitrate hexahydrate crystals (19.80% w/w Co) and 12.0 g of demineralised water were placed in a glass beaker and heated on a hotplate. 39.14 g of manganese nitrate solution (15.4% w/w Mn) was added at 60° C. and the mixture heated further until reaching 70° C. The hot solution was added to 500.05 g of 312 µm D50 titania spheres (>85% w/w anatase by XRD) in a preheated Z-blade mixer. The temperature of the titania was 64° C. and the mixer walls were 68° C. before addition of solution. The solution was poured into the mixing titania spheres over approximately three minutes. After solution addition mixing was continued for 2 minutes. 852.2 g of impregnated material was discharged and placed in 7 stainless steel trays. This material was then dried for 3 hours at 100° C. and calcined at 250° C. for 2 hours. 596.7 g of calcined material was produced.

FT Catalyst Precursor Characterization
D50=310 µm
BET SA=44 m$^2$/g
Co SA=6 m$^2$/g
Hg intrusion volume=0.28 cm$^3$/g
Hg average pore diameter=37 nm
Hg median pore diameter=45 nm
Co$_3$O$_4$ crystallite size (XRD)=13.0 nm
Co content (ICP)=10.4% w/w (oxide)
Mn content (ICP)=0.96% w/w (oxide)
Ratio of the average cobalt oxide particle size to the average pore diameter of the catalyst precursor=13:37=0.35:1.

EXAMPLE 2

Catalyst Precursor Preparation on 413 µm Titania Spheres a) 11% w/w Co, 1% w/w Mn, The method of Example 1(b) was repeated using 413 µm D50 titania spheres.

FT Catalyst Precursor Characterization
D50=412 µm
BET SA=43 m$^2$/g
Co SA=5 m$^2$/g
Hg intrusion volume=0.29 cm$^3$/g
Hg average pore diameter=43 nm
Hg median pore diameter=43 nm
Co$_3$O$_4$ crystallite size (XRD)=14.8 nm
Co content (ICP)=10.6% w/w (oxide)
Mn content (ICP)=1.03% w/w (oxide)

Ratio of the average cobalt oxide particle size to the average pore diameter of the catalyst precursor=14.8:43=0.34:1.

EXAMPLE 3

Comparative Example: Catalyst Preparation on 309 µm Alumina Spheres a) 20% w/w Co, 0.2% w/w Ru.

12.5 Kg of alumina spheres (γ-Al2O3) were placed in an RT80 mixer and the water-bath turned on at 80° C. This was left overnight to heat up. 15.9 Kg of cobalt nitrate hexahydrate crystals (19.80% w/w Co), 240 g of ruthenium nitrosyl nitrate (13.0% w/w Ru) and 1210.0 g of demineralised water were heated in stainless steel beakers on a hot plate until the cobalt nitrate crystals had melted. The solution was then transferred to a preheated spray pot. The hot solution was sprayed onto the alumina spheres at 54° C. The solution was then sprayed in over 20 minutes. After solution addition, the mixing was continued for 1 minute 30 seconds before discharging the material into a drum. 28.865 Kg of material was discharged. This was placed in stainless steel trays, which were placed in ovens and dried at 110° C. for 3 hours. The dried material was split into four batches. Each of the four batches was re-dried at 110° C. for 30 minutes then calcined at 280° C. for 2 hours.

Comparative FT Catalyst Precursor Characterization
D50=305 µm
BET SA=153 m$^2$/g
Co SA=12 m$^2$/g (425° C. reduction)
Hg intrusion volume=0.45 cm$^3$/g
Hg average pore diameter=14 nm
Hg median pore diameter=13 nm
Co$_3$O$_4$ crystallite size (XRD)=15.5 nm
Co content (ICP)=18.4% w/w (oxide)
Ru content (ICP)=0.13% w/w (oxide)
Ratio of the average cobalt oxide particle size to the mean pore diameter of the catalyst precursor=15.5:14=1.11:1.

EXAMPLE 4

Catalyst Testing

The tests were performed using 0.5 g of the catalyst precursors diluted with 2.00 g SiC placed in a laboratory reactor tube with an internal diameter of 4 mm. After in situ reduction at 300° C. (ramp 1° C./min) in pure hydrogen for 7 hours using a flow rate of 60 ml/min, the temperature was then reduced to 150° C. and the gas is switched to syngas (H$_2$:CO=2:1), and the reactors pressurized to 20 barg using a flow rate of 110 ml/min. After 6 hours, the temperature was increased (1° C./min) to 210° C. and left overnight for about 16 hours. The flow rates were then reduced first to 50 ml/min, then to the required flow rate to achieve 50% syngas conversion and data collection continued for the duration of the test (about 160 hours). Inlet gases were metered into the reactor using mass flow controllers. Gaseous, liquid and solid hydrocarbon products and the aqueous phase were analyzed by gas chromatography to achieve a mass balance from which CO conversion and selectivity were calculated. Alpha was calculated from the slope of a plot of log(Wn/n) as a function of n, for which the gradient is log($\alpha$), where Wn is the weight fraction of hydrocarbon with carbon number n, and $\alpha$ is the chain growth probability. This expression was derived from the Anderson Schulz-Flory distribution, $W_n = n\alpha^{n-1}(1-\alpha)^2$. Typically, $C_{20}$-$C_{40}$ was the range of carbon numbers used to calculate alpha. The results were as follows;

| Parameter | Example 1(a) Catalyst of Example 1(a) 20% Co Ru | Example 1(b) 11% w/w Co, 1% w/w Mn | Example 2(a) 11% w/w Co, 1% w/w Mn | Comparative Example 3(a) 20% Co Ru on alumina |
|---|---|---|---|---|
| CO conversion (%) | 40 | 48 | 47 | 37 |
| Selectivity to $CH_4$ (%) | 9.26 | 4.9 | 5.2 | 10.6 |
| Selectivity to $CO_2$ (%) | 0.00 | 0.00 | 0.00 | 0.00 |
| Selectivity to $C_2$-$C_4$ (%) | 1.48 | 1.26 | 1.55 | 2.27 |
| Selectivity to $C_{5+}$ (%) | 89.3 | 93.9 | 93.3 | 87.2 |
| GHSV ($hr^{-1}$) | 8216 | 4676 | 4475 | 8784 |
| Alpha | 0.92 | 0.92 | 0.92 | 0.89 |

Comparing Example 1(a) with Example 3(a), the results demonstrate that the titania sphere supported catalyst precursor according to the present invention produced a catalyst with an enhanced activity and selectivity to higher hydrocarbons compared with the same metal and promoter levels on a corresponding spherical alumina support. Example 2(a) demonstrates the improved performance of a Mn-promoted cobalt catalyst on the titania sphere support, compared to Example 1(a).

The invention claimed is:

1. A cobalt catalyst precursor comprising cobalt oxide crystallites disposed within pores of a titania support, wherein the catalyst precursor has a cobalt content in the range 5 to 25% by weight, expressed as Co, the cobalt oxide crystallites have an average size as determined by XRD in the range 6 to 18 nm, and the titania support is a spherical titania support with a particle size in the range 100 to 1000 μm, wherein the catalyst precursor has a pore volume of 0.2 to 0.6 cm$^3$/g and an average pore diameter in the range 30 to 60 nm, and wherein the catalyst precursor has a ratio of the average cobalt oxide crystallite size to the average pore diameter in the range 0.1:1 to 0.6:1.

2. The cobalt catalyst precursor according to claim 1 wherein the cobalt oxide crystallites have an average size in the range 7-16 nm.

3. The cobalt catalyst precursor according to claim 1 wherein the particle size of the catalyst precursor is in the range 300-800 μm.

4. The cobalt catalyst precursor according to claim 1 wherein the volume-median diameter, D[v,0.5], of the catalyst precursor is in the range 300-500 μm.

5. The cobalt catalyst precursor according to claim 1 wherein the sulphur content of the catalyst precursor is <30 ppmw, the alkali metal content of the catalyst precursor is <50 ppmw, and the chloride content of the catalyst precursor is <1500 ppmw.

6. The cobalt catalyst precursor according to claim 1 wherein the titania support used is an anatase-containing support, in which the anatase is present in an amount >50% by weight of the support.

7. The cobalt catalyst precursor according to claim 1 wherein the pore volume of the catalyst precursor is in the range 0.3 to 0.5 cm$^3$/g, and the average pore diameter is in the range 40-50 nm.

8. The cobalt catalyst precursor according to claim 1 further comprising one or more additives selected from compounds of molybdenum (Mo), barium (Ba), silver (Ag), copper (Cu), nickel (Ni), iron (Fe), vanadium (V), tin (Sn), gallium (Ga), manganese (Mn), zirconium (Zr), lanthanum (La), cerium (Ce), chromium (Cr) magnesium (Mg), zinc (Zn), aluminium (Al), thorium (Th), tungsten (W) or silicon (Si), wherein the amount of additive metal is between 1 and 25% by weight on the catalyst precursor.

9. The cobalt catalyst precursor according to claim 1 further comprising one or more promoters selected from rhodium (Rh), iridium (Ir), ruthenium (Ru), rhenium (Re), platinum (Pt) and palladium (Pd), wherein the amount of promoter metal is between 0.01 and 1.00% by weight on the catalyst precursor.

10. A method for preparing the cobalt catalyst precursor according to claim 1 by impregnating a spherical titania support with a cobalt nitrate solution and drying and calcining the impregnated titania support to form cobalt oxide crystallites within the pores of the titania support.

11. The method according to claim 10 wherein the impregnation is performed with a heated cobalt nitrate solution at a temperature above 50° C.

12. The method according to claim 10 wherein the volume of the cobalt nitrate solution used is equal to or less than the total pore volume of the titania support.

13. The method according to claim 10 wherein the impregnated support is dried at a temperature in the range 50-150° C.

14. The method according to claim 10 wherein the calcination is performed at a temperature in the range 200-350° C.

15. The method according to claim 10 wherein the calcination is performed in a fluidized bed reactor.

16. A catalyst comprising elemental cobalt crystallites formed by the reduction of the cobalt oxide crystallites in the cobalt catalyst precursor according to claim 1 with a reducing gas stream.

17. The catalyst according to claim 16 wherein the catalyst is subjected to a passivation treatment or encapsulated in a hydrocarbon wax.

18. A process to produce hydrocarbons from a synthesis gas comprising hydrogen and carbon monoxide using a catalyst according to claim 16 in a Fischer-Tropsch reactor.

19. The process according to claim 18 wherein the Fischer-Tropsch reactor is a microchannel reactor, a multi-tubular Fischer-Tropsch reactor, a slurry-phase reactor, a slurry bubble-column reactor, a loop reactor or a fluidised bed reactor.

20. The process according to claim 18 wherein the catalyst comprises said combination of the cobalt catalyst precursor or the catalyst comprising elemental cobalt crystallites formed by the reduction of the cobalt oxide crystallites in the cobalt catalyst precursor with a reducing gas stream and the Fischer-Tropsch reactor is a multi-tubular Fischer-Tropsch reactor.

21. A combination of the cobalt catalyst precursor or the catalyst comprising elemental cobalt crystallites formed by the reduction of the cobalt oxide crystallites in the cobalt catalyst precursor with a reducing gas stream according to claim 1, disposed within a catalyst carrier suitable for use in a reaction tube of a Fischer-Tropsch reactor.

22. The combination according to claim 21 wherein the catalyst carrier comprises an annular container suitable for holding the catalyst precursor or catalyst in place, said container having a perforated inner container wall defining an inner channel, a perforated outer container wall, a top surface closing the annular container and a bottom surface closing the annular container; and a surface closing the bottom of said inner channel formed by the inner container wall of the annular container.

23. The cobalt catalyst precursor according to claim 1 wherein the cobalt oxide crystallites have an average size in the range 8-12 nm.

24. The cobalt catalyst precursor according to claim 1 wherein the cobalt content of the catalyst precursor is in the range 8 to 16% by weight, expressed as Co.

25. A cobalt catalyst precursor comprising cobalt oxide crystallites disposed within pores of an anatase-containing titania support, in which the anatase is present in an amount >50% by weight of the support, wherein the cobalt oxide crystallites have an average size as determined by XRD in the range 6 to 18 nm, and the titania support is a spherical titania support with a particle size in the range 100 to 1000 µm, wherein the catalyst precursor has a pore volume of 0.2 to 0.6 cm$^3$/g and an average pore diameter in the range 30 to 60 nm, and wherein the catalyst precursor has a ratio of the average cobalt oxide crystallite size to the average pore diameter in the range 0.1:1 to 0.6:1.

\* \* \* \* \*